(12) United States Patent
Seroka

(10) Patent No.: US 10,220,584 B2
(45) Date of Patent: Mar. 5, 2019

(54) SYSTEM AND APPARATUS FOR HEATING MOLDS

(71) Applicant: Bridgestone Americas Tire Operations, LLC, Nashville, TN (US)

(72) Inventor: Edward S. Seroka, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/540,128

(22) PCT Filed: Oct. 13, 2015

(86) PCT No.: PCT/US2015/055279
§ 371 (c)(1),
(2) Date: Jun. 27, 2017

(87) PCT Pub. No.: WO2016/108993
PCT Pub. Date: Jul. 7, 2016

(65) Prior Publication Data
US 2017/0361554 A1 Dec. 21, 2017

(51) Int. Cl.
*B29D 30/06* (2006.01)
*B29D 30/48* (2006.01)
(Continued)

(52) U.S. Cl.
CPC ......... *B29D 30/0662* (2013.01); *B29D 30/48* (2013.01); *B29C 33/04* (2013.01);
(Continued)

(58) Field of Classification Search
CPC ............ B29D 30/0606; B29D 30/0662; B29D 30/48; B29D 2030/0674; B29C 33/06;
(Continued)

(56) References Cited

U.S. PATENT DOCUMENTS

| 1,566,500 A | 12/1925 | Northrup |
| 1,645,704 A | 10/1927 | Ledwinka |

(Continued)

FOREIGN PATENT DOCUMENTS

| CN | 2836395 Y | | 11/2006 |
| CN | 103805973 | * | 5/2014 |

(Continued)

OTHER PUBLICATIONS

English Abstract of CN 103805973, published May 21, 2014.*
(Continued)

*Primary Examiner* — James P MacKey

(57) ABSTRACT

Various systems and apparatuses for heating molds, including for example tire molds, are disclosed. Heating of molds may be effected via induction heating technology. In one embodiment, a system for heating a tire mold is provided, the system comprising: a tire mold formed from a mold material having a base material relative permeability, wherein the tire mold includes a mold surface for contacting a tire, the mold surface for contacting a tire having a mold surface for contacting a tire relative permeability, wherein the tire mold includes a mold back oriented substantially opposite the mold surface for contacting a tire, and wherein the mold surface for contacting a tire relative permeability is greater than the base material relative permeability.

20 Claims, 6 Drawing Sheets

(51) Int. Cl.
  *B29C 35/08* (2006.01)
  *B29C 33/56* (2006.01)
  *B29C 33/06* (2006.01)
  *B29C 33/04* (2006.01)

(52) U.S. Cl.
  CPC .............. *B29C 33/06* (2013.01); *B29C 33/56* (2013.01); *B29C 2035/0811* (2013.01); *B29D 2030/0674* (2013.01)

(58) Field of Classification Search
  CPC ................ B29C 33/56; B29C 35/0805; B29C 2035/0811; B29C 2035/0816
  See application file for complete search history.

(56) References Cited

U.S. PATENT DOCUMENTS

| | | | |
|---|---|---|---|
| 1,958,072 A * | 5/1934 | Sebrell | C25D 1/10 205/70 |
| 2,064,778 A * | 12/1936 | Bateman | B29D 30/0606 204/242 |
| 2,206,908 A * | 7/1940 | Lunt | C25D 5/06 204/212 |
| 3,294,606 A | 12/1966 | Morgan | |
| 4,699,578 A | 10/1987 | Sumner et al. | |
| 5,431,873 A * | 7/1995 | Vandenberghe | B29C 33/10 249/114.1 |
| 5,449,483 A * | 9/1995 | Greenwood | B29C 33/565 164/165 |
| 5,622,669 A | 4/1997 | Sedepro | |
| 6,655,940 B2 * | 12/2003 | Mitamura | B29D 30/0645 425/40 |
| 6,682,687 B1 * | 1/2004 | Mitamura | B29D 30/0005 264/315 |
| 6,818,872 B2 * | 11/2004 | Mitamura | B29C 35/0272 219/635 |
| 8,941,036 B2 * | 1/2015 | Okada | B29C 33/06 219/200 |
| 2009/0308861 A1 | 12/2009 | Okada | |
| 2015/0086663 A1 * | 3/2015 | Ferrand | H05B 6/105 425/28.1 |

FOREIGN PATENT DOCUMENTS

| | | |
|---|---|---|
| CN | 103805973 A | 5/2014 |
| JP | H04173313 | 6/1992 |
| JP | 2001079850 | 3/2001 |
| JP | 2001158020 | 6/2001 |
| JP | 2001198925 | 7/2001 |
| JP | 2001205636 | 7/2001 |
| JP | 2001205637 | 7/2001 |
| JP | 2002036244 | 2/2002 |
| JP | 2002052536 | 2/2002 |
| JP | 2004023904 | 1/2004 |
| JP | 2012025126 A | 2/2012 |
| WO | 2009055787 A1 | 4/2009 |

OTHER PUBLICATIONS

English Abstract of CN2836395Y, dated Nov. 8, 2006.
English Abstract of JP2001079850, dated Mar. 27, 2001.
English Abstract of JP2001198925, dated Jul. 24, 2001.
English Abstract of JP2001205636, dated Jul. 31, 2001.
English Abstract of JP2001205637, dated Jul. 31, 2001.
English Abstract of JP2002052536, dated Feb. 19, 2002.
Supplementary European Search Report, dated Jul. 3, 2018, European Patent Office, pp. 1-2.
English translation of Abstract of CN103805973A.
English translation of Abstract of JP2012025126A.
Machine translation of JP2002036244 filed on Jul. 31, 2000 owned by Kobe Steel Ltd.
Machine translation of JP2004023904 filed on Jun. 17, 2002 owned by Bridgestone Corp.
Machine translation of JP 2001-158020 published on Jun. 12, 2001 owned by Mitsubishi Heavy Ind Ltd.
Machine translation of JPH04-173313 published on Jun. 22, 1992 owned by Sanshiyuu Moorudo Kk.

* cited by examiner

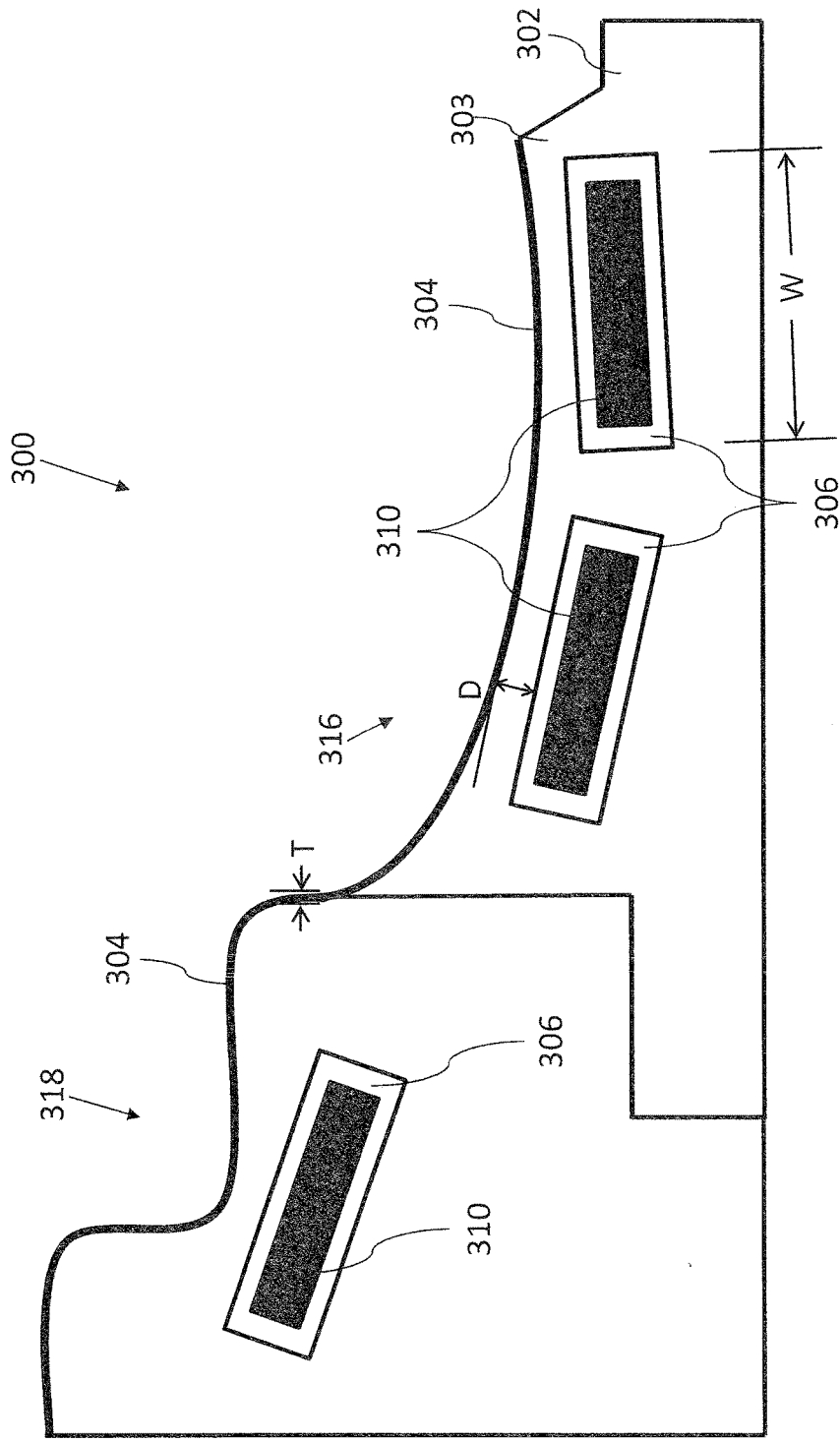

SYSTEM AND APPARATUS FOR HEATING MOLDS

BACKGROUND

Many articles are manufactured via a molding of materials into a desired shape. For example, many polymeric articles, including composites containing polymers, are formed via heated molds. One such article may include tires. Tires may be placed into contact with a mold and heated, under pressure, until the rubber within the tire is crosslinked and cured.

Many molds, including tire molds, are heated by a hot water, steam, heated gas, or other heating mediums. Molds are typically made from a metallic material. The metallic material of the mold may be heated through thermal conduction wherein heat is transferred from a heat medium, through the mold, and into the article to be molded. As a result, each portion of the mold typically obtains the same or similar temperature upon heating of the mold to the desired curing temperature. Also, portions of the mold, molding press, peripheral components, and other elements may be unnecessarily heated as these elements do not contribute to heating the article to be molded.

Heating of molds via hot water, steam, heated gas, or other heating mediums typically requires extended periods of down time during which an entire mold is heated to a curing temperature before molding, and cooled to a safe temperature following molding to permit manipulation of the mold to remove a molded article, the totality of which, including cure time, is commonly referred to as "cycle time." Additionally, heating of molds in such a manner may lead to inefficiency due to loss of heat from the mold to the surrounding environment via thermal convection and thermal conduction. Heat transferred to the surrounding environment may need to be removed via cooling such that workers in the surrounding environment are comfortable and to prevent damage to other equipment.

What is needed is a system and apparatus for heating a mold that minimizes heating and cooling times, allows for application of different mold temperatures at different portions of the mold, and maximizes energy efficiency.

SUMMARY

In one embodiment, a system for heating a tire mold is provided, the system comprising: a tire mold formed from a mold material having a base material relative permeability, wherein the tire mold includes a mold surface for contacting a tire, the mold surface for contacting a tire having a mold surface for contacting a tire relative permeability, wherein the tire mold includes a mold back oriented substantially opposite the mold surface for contacting a tire, and wherein the mold surface for contacting a tire relative permeability is greater than the base material relative permeability.

In another embodiment, a system for heating a tire mold is provided, the system comprising: a tire sideplate mold, wherein the tire sideplate mold includes a mold surface for contacting a tire, wherein the tire sideplate mold includes a mold back oriented substantially opposite the mold surface for contacting a tire, wherein the tire sideplate mold includes at least one pocket; and at least one induction heating element contained within the at least one pocket.

In another embodiment, a system for heating a tire mold is provided, the system comprising: a tire bead ring mold, wherein the tire bead ring mold includes a mold surface for contacting a tire, wherein the tire bead ring mold includes a mold back oriented substantially opposite the mold surface for contacting a tire, wherein the tire bead ring mold includes at least one pocket; and at least one induction heating element contained within the at least one pocket.

BRIEF DESCRIPTION OF THE DRAWINGS

The accompanying figures, which are incorporated in and constitute a part of the specification, illustrate various example systems and apparatuses, and are used merely to illustrate various example embodiments. In the figures, like elements bear like reference numerals.

FIG. 3B illustrates a sectional view of apparatus 300 taken on line 3-3 in FIG. 3A.

DETAILED DESCRIPTION

A mold for molding and/or curing an article may be heated by induction heating. Induction heating may involve heating an electrically conducting object by electromagnetic induction, where eddy currents are generated within the electrically conducting object and resistance leads to Joule heating of the object. An induction heater may include an electromagnet, through which a high-frequency AC is passed. In one embodiment, induction heating generates heat by magnetic hysteresis losses in materials that have significant relative permeability.

An alternating current ("AC") having any of a variety of frequencies may be used in inductive heating. The frequency of the AC may depend upon the size of the object to be heated, the material type to be heated, the coupling/distance (between the coil and the object to be heated), the penetration depth, and the like.

The AC may be applied at a low voltage. The AC may be applied at a high current. The AC may be applied at a high frequency.

Any of various frequencies of AC may be used in induction heating. For example, frequencies between about 5 kHz and about 30 kHz may be used with thicker workpiece materials, frequencies between about 100 kHz and about 400 kHz may be used with smaller and/or thinner workpiece materials or workpiece materials in which shallower penetration is desired, and frequencies near about 480 kHz may be used with microscopic or otherwise extremely small workpieces.

Induction heating may be particularly efficient for molding articles due to the ability to focus energy to heat a mold in a specific surface, including for example a mold surface. Heat from the mold surface can be imparted into the article to be cured via conduction heating. In one embodiment, induction heating may result in about 85% of heat generated in a material, such as a mold, being focused near its surface.

Figure 1A:
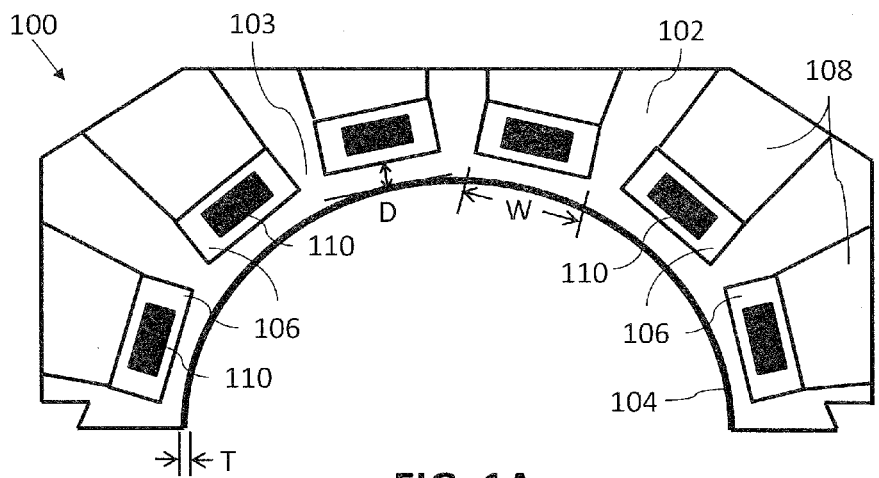
FIG. 1A illustrates a sectional view of an example arrangement of an apparatus 100 for heating molds.

FIG. 1A illustrates a sectional view of an example arrangement of an apparatus 100 for heating molds. Apparatus 100 may include a mold 102. Mold 102 may include a mold for molding any of a variety of polymeric materials, including for example rubber. Mold 102 may include a mold for a tire, including for example a pneumatic tire or a non-pneumatic tire. Mold 102 may include a base material 103. Mold 102 may include a mold surface contacting a tire ("MSCT") 104. MSCT 104 may be that portion of mold 102 configured to engage with any article to be molded within mold 102.

MSCT 104 may be a separate portion of mold 102 that is configured to engage with base material 103, and to engage with any article to be molded within mold 102. MSCT 104 and base material 103 may be configured to operatively connect to one another to form at least a portion of mold 102. MSCT 104 may be an integral portion of at least one of mold 102 and base material 103, inasmuch as MSCT 104 may be permanently attached to at least one of mold 102 and base material 103.

Mold 102 may include any of a variety of mold types. Mold 102 may include any of a variety of portions of a tire mold. Mold 102 may include any of a variety of portions of a tire mold, including for example a mold segment, a sidewall, a sideplate, a bead ring, a tread ring (non-segmented mold), a mold back (non-segmented mold), peripheral equipment, and the like. Mold 102 may be a segmented mold, wherein a plurality of separate segments are configured to be assembled for molding a tire, including a tire tread. Mold 102 may be a non-segmented mold including a tread ring and mold backs. Mold 102 may be a non-segmented mold, which incorporates tread geometry directly engraved into the mold backs.

Mold 102 may include at least one pocket 106 oriented within the body of mold 102. At least one pocket 106 may be machined into mold 102. At least one pocket 106 may be cast into mold 102. At least one pocket 106 may be formed into mold 102 through any of a variety of methods.

At least one pocket 106 may be oriented near MSCT 104. At least one pocket 106 may be oriented adjacent MSCT 104. At least one pocket 106 may be oriented in base material 103. At least one pocket may be oriented between base material 103 and MSCT 104.

MSCT 104 may have a thickness T. Thickness T may be about 3.2 mm. Thickness T may be between about 1.6 mm and about 4.8 mm. Thickness T may be between about 2.4 mm and about 5.6 mm. Thickness T may be between about 1.6 mm and about 6.4 mm. Thickness T may be less than about 1.6 mm. Thickness T may be greater than about 6.4 mm. Thickness T may have any value within the recited ranges. Thickness T may be in a range between any recited lower bound and any recited upper bound herein.

MSCT 104 may have a thickness limited by the material of MSCT 104. That is, thickness T may need to be greater, or lesser, due to material constraints. Thickness T may be limited to a minimum value that is thick enough to encapsulate the depths of various features of mold 102 that are contained within MSCT 104, for example, logos, lettering, information, and the like. Thickness T may be limited to a minimum value that is thick enough to avoid distortion, warping, or the like, of MSCT 104 during exposure to heat of curing. MSCT 104 may be prepared via machining, so as to create a negative of the surface of the article to be molded in mold 102. Thickness T may be limited to a minimum value that is thick enough to withstand machining without being distorted, deformed, damaged, destroyed, or the like. MSCT 104 may be applied to base material 103 to create mold 102, and any article molded therein may be exposed to heat and pressure. Accordingly, thickness T may be limited to a minimum value that is thick enough to withstand the heat and/or pressure of molding and/or curing an article within mold 102.

MSCT 104 may have a substantially uniform thickness T, such that each part of MSCT 104 is the same thickness T. Alternatively, MSCT 104 may have varying thicknesses, such that part of MSCT 104 has a thickness T, while another part has a thickness less than and/or greater than thickness T.

In one embodiment, MSCT 104 may be created by spraying, laminating, or the like, a material, such as a molten metal, a ceramic, or the like, onto a forming apparatus. MSCT 104 may be formed by a layer of spray. The layer may have a thickness T as disclosed above.

MSCT 104 may be made out of any of a variety of materials. For example, MSCT 104 may be a metal, such as an iron or a steel. MSCT 104 may be an alloy. MSCT 104 may be a composite. MSCT 104 may be made out of a material that responds to induction heating, which materials may include an iron or an iron alloy. MSCT 104 may be made out of a material that responds to induction heating, which material may include a ferromagnetic material. MSCT 104 may be made out of a material that responds to induction heating and/or in which magnetic hysteresis may occur, which material may include a magnetic material.

MSCT 104 may be a material plated or coated with another material, for example, a nickel coating. MSCT 104 may have a uniform thickness or gauge, such that it is always the same thickness regardless of features machined into MSCT 104 to be imparted on an article to be molded. MSCT 104 may be plated or coated with another material, wherein the other material is applied in a uniform thickness.

MSCT 104 may comprise a material having magnetic properties. That is, MSCT 104 may comprise a material, such as steel, that has magnetic properties. MSCT 104 may comprise a material having a relative permeability in a range between about 100 and about 600. MSCT 104 may comprise a material having a relative permeability in a range between about 100 and about 500.

Relative permeability may be defined as the ratio of permeability of a medium to the permeability of free space.

Permeability, or magnetic permeability, may be defined as the degree to which the magnetic lines of force can penetrate or permeate a material. Permeability, or magnetic permeability, may be defined as the ability of a material to permit passage of magnetics lines of force through it. Permeability may be equal to, or proportionate to, the magnetic flux density established within a material by a magnetizing field, divided by the magnetic field strength of the magnetizing field.

At least one induction heating element ("IHE") 110 may interact with MSCT 104 via inductive heating to cause MSCT 104 to heat. Materials with higher relative permeability may heat more quickly when exposed to IHE 110 than materials with a lower relative permeability. In one embodiment, base material 103 may be a material having less relative permeability than MSCT 104. As a result, at least one IHE 110 may cause MSCT 104 to heat via inductive heating more than base material 103. That is, more heat may be generated by IHE 110 in MSCT 104 than in base material 103. MSCT 104 may have a higher relative permeability than the remainder of mold 102. MSCT 104 may heat more quickly than at least one of the remainder of mold 102 and base material 103.

At least one pocket 106 may be in communication with an outside of mold 102 via at least one channel 108. At least one channel 108 may be machined into base material 103. At least one channel 108 may be cast into base material 103. At least one channel 108 may be formed in base material 103 via any of a variety of methods. At least one channel 108 may communicate with an outside surface of mold 102 substantially opposite MSCT 104. At least one channel 108 may communicate with a surface of base material 103 adjacent MSCT 104. At least one channel 108 may be in communication with an outside surface of base material 103 other than that surface contacting MSCT 104. Mold 102 may include a mold back, which may be an outside surface of mold 102 substantially opposite MSCT 104. Each of at least one pocket 106 may include a corresponding channel 108. A series of pockets 106 may include a channel 108.

Apparatus 100 may include at least one IHE 110. IHE 110 may be operatively connected to mold 102. Each of at least one pocket 106 may include at least one IHE 110. At least one IHE 110 may be located in any of a variety of portions of mold 102, including for example in a mold segment, in a sidewall, in a sideplate, in a bead ring, in a tread ring, in a mold back, in peripheral equipment, and the like. At least one IHE 110 may be used for inductive heating of at least a portion of mold 102.

At least one IHE 110 may be configured to heat the portion of mold 102 adjacent to its respective pocket 106. At least one IHE 110 may be configured to heat a portion of MSCT 104 oriented near IHE 110.

A portion of base material 103 having a depth D may be oriented between at least one IHE 110 and MSCT 104. Depth D may be selected to achieve desired heating of the specific portion of MSCT 104 oriented near a specific IHE 110. Depth D may be the same for any number of IHEs 110. Depth D may vary for any number of IHEs 110. Depth D may be increased at a specific point where the desired temperature of MSCT 104 at that specific point is lower than other portions of MSCT 104. Depth D may be decreased at a specific point where the desired temperature of MSCT 104 at that specific point is higher than other portions of MSCT 104. It may be desirable to apply more heat to thicker portions of an article to be molded. It may be desirable to apply less heat to thinner portions of an article to be molded. It should be understood that depth D may vary from any of at least one pocket 106 to another pocket 106. Additionally, it should be understood that the frequency and/or amperage of electrical input to IHE 110 may be varied, or constant, between pockets 106 so as to affect the heat produced in MSCT 104 near a particular IHE 110.

At least one pocket 106 may have a width W. Width W may be measured substantially laterally. Where mold 102 is a tire mold, width W may be measured substantially laterally, substantially radially, or a combination of laterally and radially as pockets 106 are oriented around the periphery of the molded tire. Width W may be selected to permit installation of at least one IHE 110 into at least one pocket 106. Width W may be selected to provide apparatus 100 with an adequate density of IHEs 110 to heat mold 102 and/or MSCT 104 as desired or necessary for curing a molded article. It should be understood that width W may vary from any of at least one pocket 106 to another pocket 106.

IHE 110 may have any of a variety of sizes depending upon any of a variety of factors. For example, size of at least one IHE 110 may depend upon the portion of mold 102 in which that specific IHE 110 is to be oriented, heat needed from that specific IHE 110, depth D of base material 103 adjacent to that specific IHE 110, size of pocket 106 into which IHE 110 is to be placed, and the like. IHE 110 may be any of a variety of IHE systems. IHE 110 may be a coiled copper element. IHE 110 may be a coil of electrically conductive material through which a current is directed. In one embodiment, IHE 110 may be operatively connected with a cooling device to prevent IHE 110 from overheating, which may lead to destruction of, or damage to, IHE 110 or mold 102. The cooling device may be local to IHE 110 and oriented in or near pocket 106. The cooling device may be oriented in base material 103 near IHE 110. The cooling device may be oriented on a surface of mold 102 adjacent IHE 110.

IHE 110 may have any of a variety of shapes depending upon any of a variety of factors. For example, shape of IHE 110 may depend upon the portion of mold 102 in which that specific IHE 110 is to be oriented, size of pocket 106 into which IHE 110 is to be placed, and the like. That is, where an IHE 110 is configured to be located near and heat a curved portion of MSCT 104, that IHE 110 may be curved in a manner similar to that portion of MSCT 104. Where an IHE 110 is configured to be located near a substantially planar portion of MSCT 104, that IHE 110 may be substantially planar.

Alternatively, each IHE 110 may be sized and/or shaped the same so as to simplify assembly and/or manufacture of apparatus 100.

The number of IHEs 110 contained within a specific portion of mold 102 may depend upon the size, shape, and desired temperature of the mold portion being heated. The density and/or spacing of IHEs 110 in a specific portion of mold 102 may depend upon the size, shape, and desired temperature of the mold portion being heated.

At least one IHE 110 may be operatively connected to a controller (not shown). At least one IHE 110 may be connected via at least one wire to a controller (not shown). At least one IHE 110 may act in concert with one or more other IHE 110 to selectively heat at least a portion of mold 102 and MSCT 104. At least one IHE 110 may act in concert with one or more other IHE 110 to selectively heat a first portion of mold 102 and MSCT 104 to a first temperature and selectively heat a second portion of mold 102 and MSCT 104 to a second temperature. At least one IHE 110 may act in concert with any number of other IHEs 110 to selectively control the temperature of various portions of mold 102 and MSCT 104.

IHE 110 may be operatively connected to an AC source. IHE 110 may be electrically connected to an AC source. IHE 110 may be wired to an AC source. In use, current from an AC source may flow through IHE 110. Electromagnetic current may create a change in magnetic field near IHE 110, including within MSCT 104. The flow of current, also known as an eddy current, may be induced in MSCT 104 to generate heat. As a result, IHE 110 may create a localized heating of MSCT 104. The heat generated by IHE 110 may be proportional to the electric current squared, multiplied by the resistance of the material of mold 102. The heat generated by IHE 110 may be proportional to the electric current squared, multiplied by the resistance of the material of base material 103. The heat generated by IHE 110 may be proportional to the electric current squared, multiplied by the resistance of the material of MSCT 104.

At least one IHE 110 may include a plurality IHEs 110. Current applied to IHE 110 may be directly related to the heat generated by IHE 110. Different amperages may be applied to different IHEs 110 such that different IHEs 110 generate different heats. One may select different heats based upon the portion of mold 102 and/or MSCT 104 to which heat is being applied. For example, where the molded article is a tire, one may apply greater amounts of heat to portions of the tire having higher gauge and lesser amounts of heat to portions of the tire having lesser gauge. In this manner, a controller (not shown) may control localized heat applied to any of various portions of mold 102 and/or MSCT 104 depending upon heat needed to cure any of corresponding portions of the molded article.

IHE 110 may include an amperage and frequency. Amperage and frequency may be selected based upon a number of factors, including for example: material of MSCT 104, thickness of MSCT 104, material of mold 102, overall thickness of mold 102, depth D, and the like. Regarding material of mold 102, more resistive materials, such as steel, may heat faster while less resistive materials, such as aluminum or copper, may heat slower. The rate at which IHE 110 heats MSCT 104 may be a function of at least one of: depth D, which may represent the distance between IHE 110 and MSCT 104; the material of MSCT 104; the material of base material 103; the frequency of current supplied to IHE 110; and the amplitude of current supplied to IHE 110.

A plurality of IHEs 110 may be oriented in any of a variety of patterns. For example, a plurality of IHEs 110 may be oriented using a concentric pattern, a radial pattern, a combination of a concentric pattern and a radial pattern, or any other pattern or combination.

MSCT 104 may include a metallic surface coating that is a material that is different from other portions of mold 102. Base material 103 may be made from any of a variety of materials, including for example a steel, an aluminum, a non-metallic material, and the like. MSCT 104 may include a metallic surface coating that is applied to base material 103 and which is more resistive compared to base material 103. MSCT 104 may include a metallic surface coating having a high relative permeability. Base material 103 may have a relative permeability and MSCT 104 may include a MSCT material having a relative permeability, wherein the relative permeability of the MSCT material is greater than the relative permeability of base material 103.

Materials having high resistance may heat faster. Materials having high relative permeability may heat faster. Materials having high resistance may heat faster when heating with IHEs 110. MSCT 104 may include a coating having a higher resistance or relative permeability than other portions of mold 102 such that MSCT 104 heats faster than other portions of mold 102 (e.g., base material 103). Application of a higher resistance coating to MSCT 104 may permit a higher rate of heat transfer from IHE 110 to MSCT 104.

Mold 102 may be a mold for curing a tire bead, which may be a bead ring. MSCT 104 may be configured to contact at least a portion of a tire bead area. At least one pocket 106 for at least one IHE 110 may be oriented below (e.g., radially inward of) the bead ring mold 102 bead contour. At least one pocket 106 can be machined from the back of mold 102 via a channel 108. IHEs 110 may be oriented in a concentric pattern about at least a portion of the circumference of bead ring mold 102. IHEs 110 may be oriented in a radial pattern about at least a portion of the circumference of bead ring mold 102. IHEs 110 may be oriented in any of a variety of patterns about at least a portion of the circumference of bead ring mold 102, including a combination of patterns.

In one embodiment, apparatus 100 may operate in conjunction with a curing bladder (not shown). The curing bladder may be oriented within the article to be cured, including for example a tire. The curing bladder may apply heat and pressure to the interior of the article to be cured, thereby forcing the article to be cured into mold 102. The curing bladder may be heated via any of a variety of traditional means, including for example hot water within the bladder, hot gas (such as nitrogen) within the bladder, steam within the bladder, and the like. Alternatively, or additionally, the curing bladder may include an integrated thin metallic mesh, such as a steel mesh. IHEs located within the curing bladder (not shown) may react with the metallic mesh thus causing heat within the curing bladder. Heat may transfer from the curing bladder to the article to be molded and cured. The metallic mesh may be oriented either within the thickness of the curing bladder, or on a surface of the curing bladder.

Apparatus 100 may be used to mold articles in any of a variety of ways.

For example, apparatus 100 may utilize at least one IHE 110 to provide the heat required to cure a molded article. At least one IHE 110 may exclusively provide all heat necessary for curing.

Alternatively, apparatus 100 may utilize at least one IHE 110 to provide a primary source of heat required to cure a molded article, with supplemental sources of heat utilized as needed. That is, apparatus 100 may include mold 102 utilizing both at least one IHE 110 and at least one of a traditional mold heating means, such as a hot water, steam, heated gas, or other heating mediums. The traditional mold heating means may maintain mold 102 at a first temperature or within a first temperature range, while at least one IHE 110 may be controlled, activated, or otherwise selectively operated to raise the temperature of mold 102 to a second temperature or within a second temperature range. The first temperature or first temperature range may be a temperature that allows mold 102 to be safely manipulated by personnel or equipment used during the molding process. The second temperature or second temperature range may be that temperature desired or necessary for curing the molded article. Use of at least one IHE 110 as a primary source of heat may reduce the time needed to heat mold 102 prior to curing a rubber article within mold 102. In one embodiment, only MSCT 104 may be heated, or targeted for heating, by IHE 110.

In one embodiment, at least one IHE 110 is used to heat at least MSCT 104. MSCT 104 may be heated to an appropriate temperature for curing more quickly than through traditional mold heating mediums. Additionally, where MSCT 104 is specifically targeted for heating, and where MSCT 104 has less mass than the rest of mold 102, MSCT 104 may cool more quickly than traditional molds using traditional mold heating mediums (e.g., wherein the entire mold is heated). As a result, the cycle time for a rubber article in mold 102 using MSCT 104 and at least one IHE 110 may be reduced due to faster heating, and cooling, of MSCT 104 compared to traditional molds. That is, while cure time for the rubber article may remain the same (the amount of time it takes a rubber article to cure may be a property of the specific rubber compound(s) used in the article, rather than a property of the mold), the cycle time for curing that rubber article may be less than through traditional methods, where the cycle time accounts for heating and cooling of mold 102.

Alternatively, apparatus 100 may utilize at least one IHE 110 to provide a supplementary source of heat required to cure a molded article, with primary sources of heat also utilized as needed. That is, apparatus 100 may include mold 102 utilizing both at least one IHE 110 and at least one of a traditional mold heating means, such as a hot water, steam, heated gas, or other heating mediums. At least one IHE 110 may be controlled, activated, or otherwise selectively operated to maintain the temperature of mold 102 to a first temperature or within a first temperature range The traditional mold heating means may raise mold 102 to a second temperature or within a second temperature range. The first temperature or first temperature range may be a temperature that allows mold 102 to be safely manipulated by personnel or equipment used during the molding process. The second temperature or second temperature range may be that temperature desired or necessary for curing the molded article.

In one embodiment, apparatus 100 may undergo two stages of operation. One stage may be that during which mold 102 is heated to adequately cure a molded article contained within or contacted to mold 102. Another stage may be that during which mold 102 and/or a press containing apparatus 100 and mold 102 is opened during loading or unloading of a molded article to be molded, or which has been molded, in mold 102. The curing stage may require a second temperature or second temperature range, wherein the loading/unloading stage may require a first temperature or first temperature range.

Different curing temperatures (second temperature or second temperature range) may be maintained between various portions of the article to be molded, which may be a tire. For example, different curing temperatures may be maintained in the tread surface portion of the tire, one or more portions of the sidewall of the tire, one or more portions of a bladder utilized to cure a tire, and/or a bead portion of the tire. These different curing temperatures may be achieved through control of at least one IHE 110 as described above.

Figure 1B:
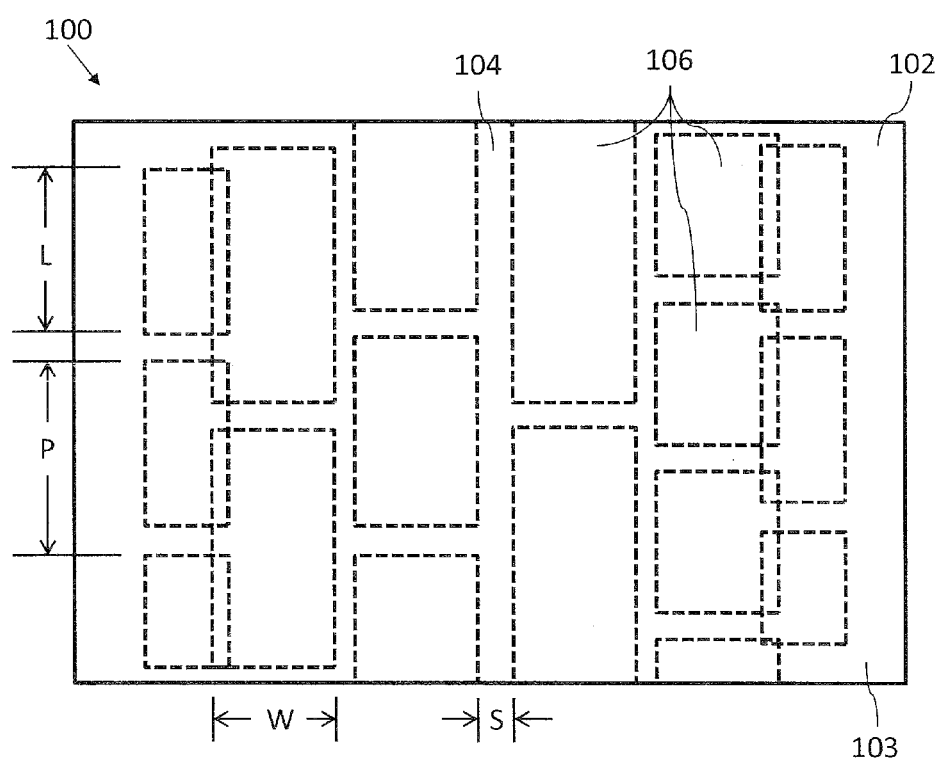
FIG. 1B illustrates a plan view of an example arrangement of apparatus 100 for heating molds.

FIG. 1B illustrates a plan view of an example arrangement of apparatus 100 for heating molds. FIG. 1B illustrates a plan view of the MSCT 104 side, and in the case of a tire mold, radially inner side, of mold 102.

At least one pocket 106 may be oriented in circumferentially-extending rows. As illustrated, rows of pockets 106 may appear to overlap adjacent rows, but this may be by virtue of the fact that mold 102 may be a tire mold and thus curve about the radially outer portion of the tire from one tire shoulder to the other.

Rows of at least one pocket 106 may have a spacing S between adjacent rows. Spacing S may be measured substantially laterally. Where mold 102 is a tire mold, spacing S may be measured substantially laterally, substantially radially, or a combination of laterally and radially as pockets 106 are oriented around the periphery of the molded tire. Spacing S may be selected to provide apparatus 100 with an adequate density of IHEs 110 to heat mold 102 and/or MSCT 104 as desired or necessary for curing a molded article. It should be understood that spacing S may vary either between a first set of rows and a second set of adjacent rows, or even within a single set of rows (that is, pockets 106 may be separated by more or less space as one measures along two adjacent rows.

At least one pocket 106 may include a length L. Length L may be measured substantially longitudinally. Where mold 102 is a tire mold, length L may be measured substantially circumferentially as pockets 106 may be oriented around the circumference of the molded tire. Length L may be selected to permit installation of at least one IHE 110 into at least one pocket 106. Length L may be selected to provide apparatus 100 with an adequate density of IHEs 110 to heat mold 102 and/or MSCT 104 as desired or necessary for curing a molded article. It should be understood that length L may vary from any of at least one pocket 106 to another pocket 106, including pockets 106 in the same row.

At least one pocket 106 may be oriented in at least one row. At least two pockets may have a pitch P within the row, defined as the distance from a first point on a first pocket 106 to the same point on a second adjacent pocket 106 in the same row. Pitch P may be measured substantially longitudinally. Where mold 102 is a tire mold, pitch P may be measured substantially circumferentially as pockets 106 may be oriented around the circumference of the molded tire. Pitch P may be selected to provide apparatus 100 with an adequate density of IHEs 110 to heat mold 102 and/or MSCT 104 as desired or necessary for curing a molded article. It should be understood that pitch P may vary from any set of adjacent pockets 106 to another set of adjacent pockets 106 oriented in a row.

As illustrated, at least one pocket 106 may have a substantially longitudinal and/or circumferentially-extending orientation. It should be understood that at least one pocket 106 may have any of a variety of orientations, including circumferentially, axially, radially, or some orientation between two of these directions. It should be understood that at least one pocket 106 may have any of a variety of shapes or cross-sections, including square, rectangular, oval, circular, spherical, elliptical, or any regular or irregular shape.

In one embodiment, mold 102 comprises a plurality of molds oriented adjacent one another. For example, a first mold 102 may be a tread ring mold, while a second mold 102 may be a sidewall mold. The two molds may be fitted against one another to mold a tire. The two molds may each form adjoining portions of the tire. In one embodiment, first mold 102 may comprise base material 103 including a first thermal expansion coefficient. For example, first base material 103 may include aluminum, having a relatively high thermal expansion coefficient. Second mold 102 may comprise base material 103 including a second thermal expansion. For example, second base material 103 may include steel, having a relatively low thermal expansion coefficient, and lower than that of aluminum. In such an arrangement, the two molds 102 being oriented adjacent one another may expand at different rates, thus possibly creating a gap through which rubber from the molded tire could flow, creating what is referred to as "flash." Flash may be undesirable in the molding of many rubber articles, such as tires.

However, first mold 102 may include first MSCT 104 formed from steel, and thus matching second base material 103. Second mold 102 may not include any MSCT 104. In such an arrangement, first MSCT 104 and second base material 103 may have the same thermal expansion coefficient, such that when heated the two expand together and avoid gaps that may allow for the creation of flash.

Figure 2A:
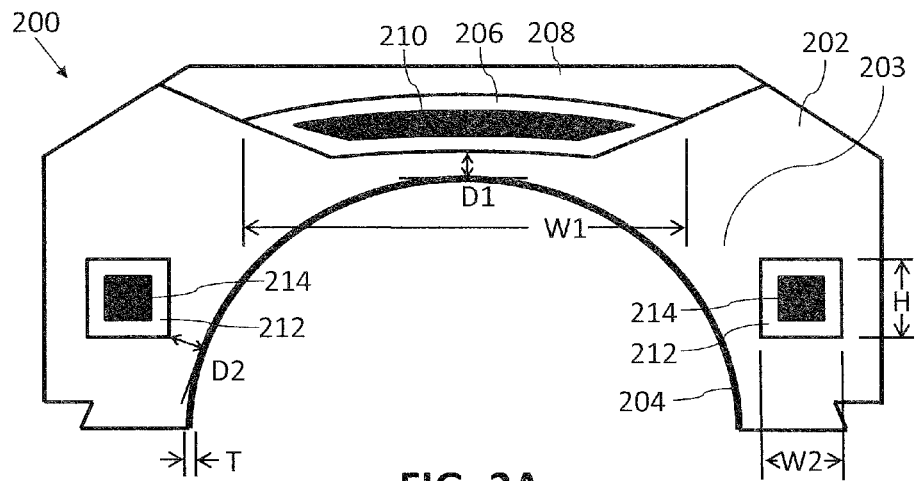
FIG. 2A illustrates a sectional view of an example arrangement of an apparatus 200 for heating molds.

FIG. 2A illustrates a sectional view of an example arrangement of an apparatus 200 for heating molds. Apparatus 200 may include a mold 202. Mold 202 may include a mold for molding any of a variety of polymeric materials, including for example rubber. Mold 202 may include a mold for a tire, including for example a pneumatic tire or a non-pneumatic tire. Mold 202 may include a base material 203. Mold 202 may include a mold surface contacting a tire ("MSCT") 204. MSCT 204 may be that portion of mold 202 configured to engage with any article to be molded within mold 202. MSCT 204 may be an independent element selectively attached to base material 203. MSCT 204 may be an integral element integrally attached to base material 203.

Mold 202 may include at least one central pocket 206 oriented at or near the center of mold 202 in base material 203. Central pocket 206 may be in communication with a side of mold 202 via a channel 208. Channel 208 may open to a side of mold 202 opposite MSCT 204. Channel 208 may open to a side of mold 202 adjacent to MSCT 204. Pocket 206 may contain at least one THE 210. Pocket 206 may include a width W1 selected in the same manner as width W of pockets 106 described above with respect to FIGS. 1A and 1B. Pocket 206 may be separated from MSCT 204 by a depth D1 of mold 202, selected in the same manner as depth D described above with respect to FIG. 1A.

Mold 202 may include at least one lateral pocket 212 oriented at or near the axially outer sides of mold 202. At least one pocket 212 may contain at least one THE 214. At least one pocket 212 may have a width W2 selected in the same manner as width W of pockets 106 described above with respect to FIGS. 1A and 1B. At least one pocket 212 may have a height H. Height H may be selected to permit installation of IHE 214 of a size necessary for heating of mold 202 and/or MSCT 204. Pocket 212 may be separated from MSCT 204 by a depth D2 of mold 202, selected in the same manner as depth D described above with respect to FIG. 1A.

Figure 2B:
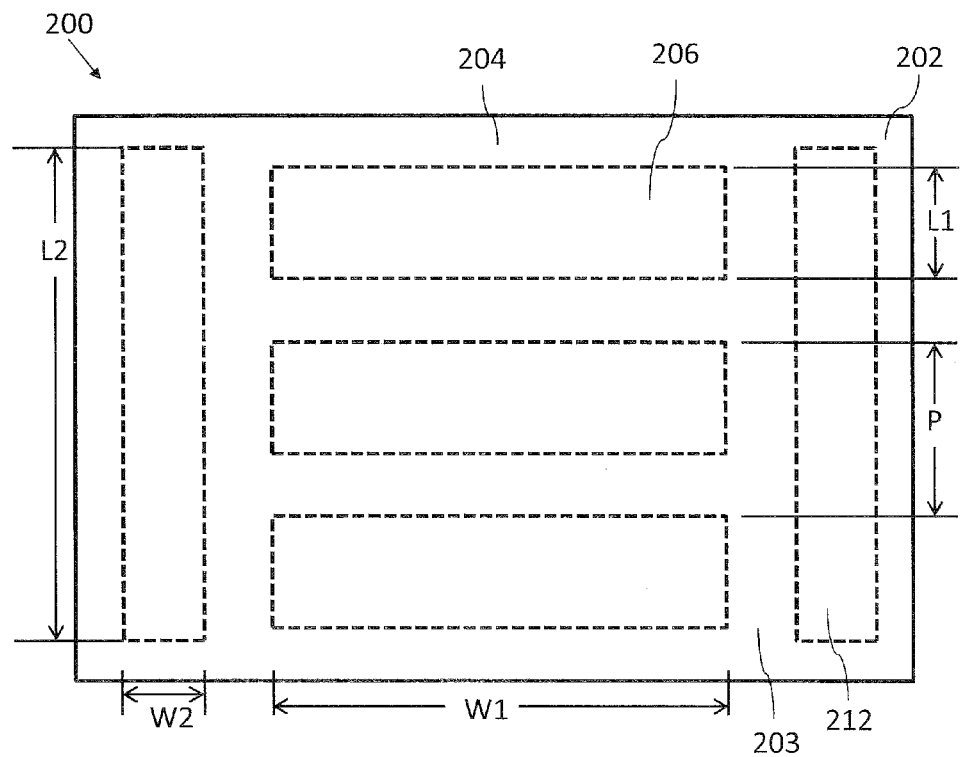
FIG. 2B illustrates a plan view of an example arrangement of apparatus 200 for heating molds.

FIG. 2B illustrates a plan view of an example arrangement of apparatus 200 for heating molds. FIG. 2B illustrates a plan view of the MSCT 204 side, and in the case of a tire mold, radially inner side, of mold 202.

At least one pocket 206 may be oriented substantially axially, such that it includes a greater length in its axially-extending edge than its longitudinal or circumferentially-extending edge. At least one pocket 206 may be oriented in any of a variety of directions within mold 202. At least one pocket 206 may include a plurality of similar pockets organized substantially within at least one longitudinally-extending/circumferentially-extending row.

At least one pocket 206 may include a length L1, selected in the same manner as length L described above with respect to FIG. 1B.

At least one pocket 206 may include a pitch P, selected in the same manner as pitch P described above with respect to FIG. 1B.

At least one pocket 212 may be oriented substantially longitudinally and/or circumferentially. At least one pocket 212 may include a greater length on its longitudinal or circumferentially-extending edge than its axially-extending edge. At least one pocket 212 may extend about the entire longitudinal or circumferential length of mold 202. Where mold 202 is a segmented mold, at least one pocket 212 may be configured to align with at least one pocket (not shown) of an adjacent mold segment (not shown) such that when assembled, a continuous circumferential or longitudinal pocket exists in mold 202. Alternatively, at least one pocket 212 may extend discontinuously about the longitudinal or circumferential length of an assembled segmented mold 202. At least one pocket 212 may be oriented in any of a variety of directions within mold 202. At least one pocket 212 may include a plurality of similar pockets organized substantially within at least one longitudinally-extending/circumferentially-extending row.

At least one pocket 212 may include a length L2, selected in the same manner as length L described above with respect to FIG. 1B. Length L2 may be the same as or less than the length of mold 202.

Figure 3A:
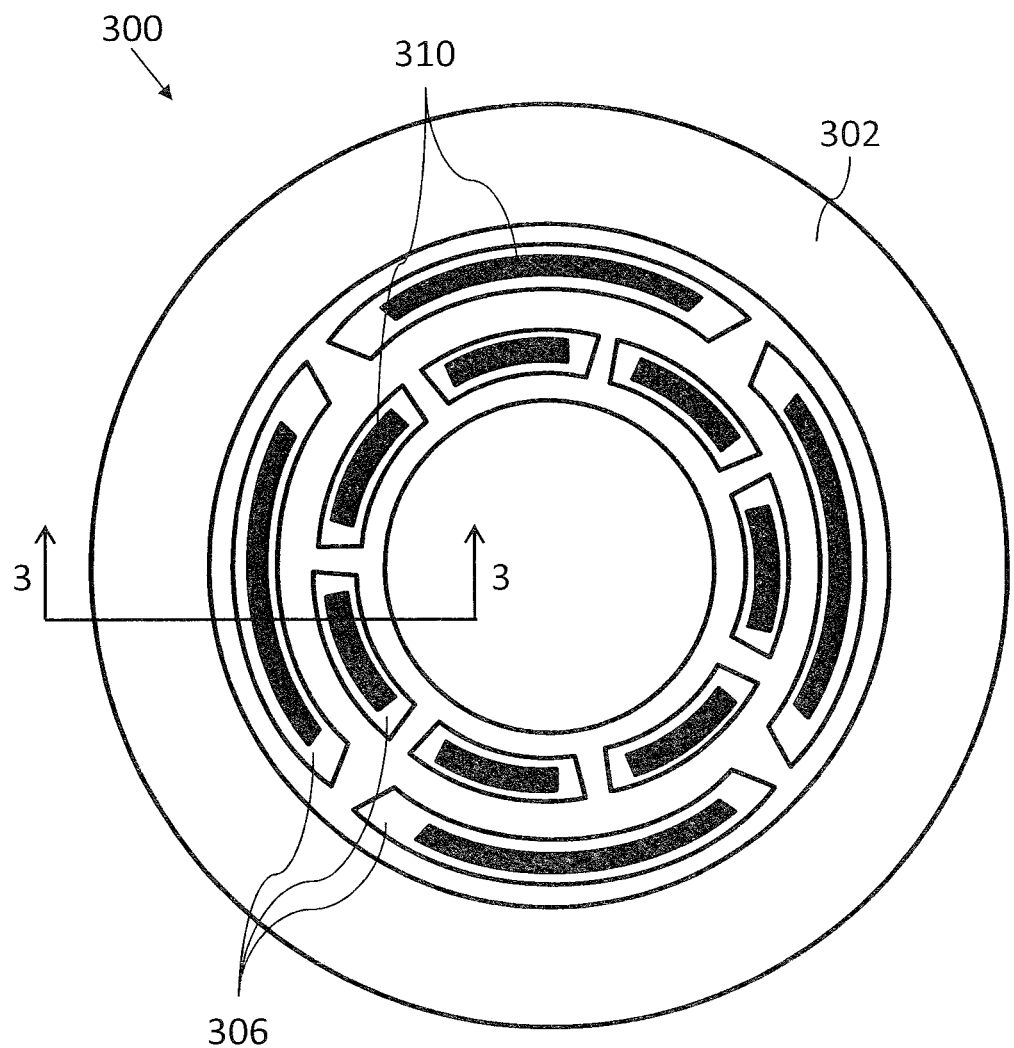
FIG. 3A illustrates an elevation view of an example arrangement of an apparatus 300 for heating molds.

FIG. 3A illustrates an elevation view of an example arrangement of an apparatus 300 for heating molds. Apparatus 300 may include a mold 302. Mold 302 may be a sideplate for a tire mold.

Mold 302 may include at least one pocket 306. At least one pocket 306 may contain at least one THE 310. At least one THE 310 may be configured to heat at least a portion of a MSCT (not shown) of mold 302. At least one IHE 310 may be configured to heat at least a portion of mold 302.

As illustrated, at least one pocket 306 and/or THE 310 may extend substantially circumferentially about mold 302. Alternatively, at least one pocket 306 and/or THE 310 may extend in any of a variety of directions, including for example circumferentially, radially, or a combination of the circumferential and radial directions. Alternatively, at least one pocket 306 and/or THE 310 may extend in a combination of directions.

FIG. 3B illustrates a sectional view of apparatus 300 taken on line 3-3 in FIG. 3A. Mold 302 may include a base material 303. Mold 302 may include a MSCT 304. At least one pocket 306 may be separated from MSCT 304 by a depth D of mold 302. Depth D may be selected in the same manner as depth D described above with respect to FIG. 1A. At least one pocket 306 may have a width W, selected in the same manner as width W described above with respect to FIG. 1A.

Mold 302 may include multiple mold portions, including for example a sidewall mold 316 and a bead ring mold 318. In practice, sidewall mold 316 may be used to form a tire sidewall surface, whereas bead ring mold 318 may be used to form a tire bead profile surface.

Bead ring mold 318 may be a negative of a desired bead profile surface. At least one pocket 306 and THE 310 may be oriented in bead ring mold 318. THE 310 may heat at least a portion of MSCT 304. THE 310 may heat a metallic bead bundle and/or steel cord oriented within the tire's bead portion. THE 310 may heat both at least a portion of MSCT 304 oriented in bead ring mold 318, and a metallic bead bundle and/or steel cord.

Figure 4A:
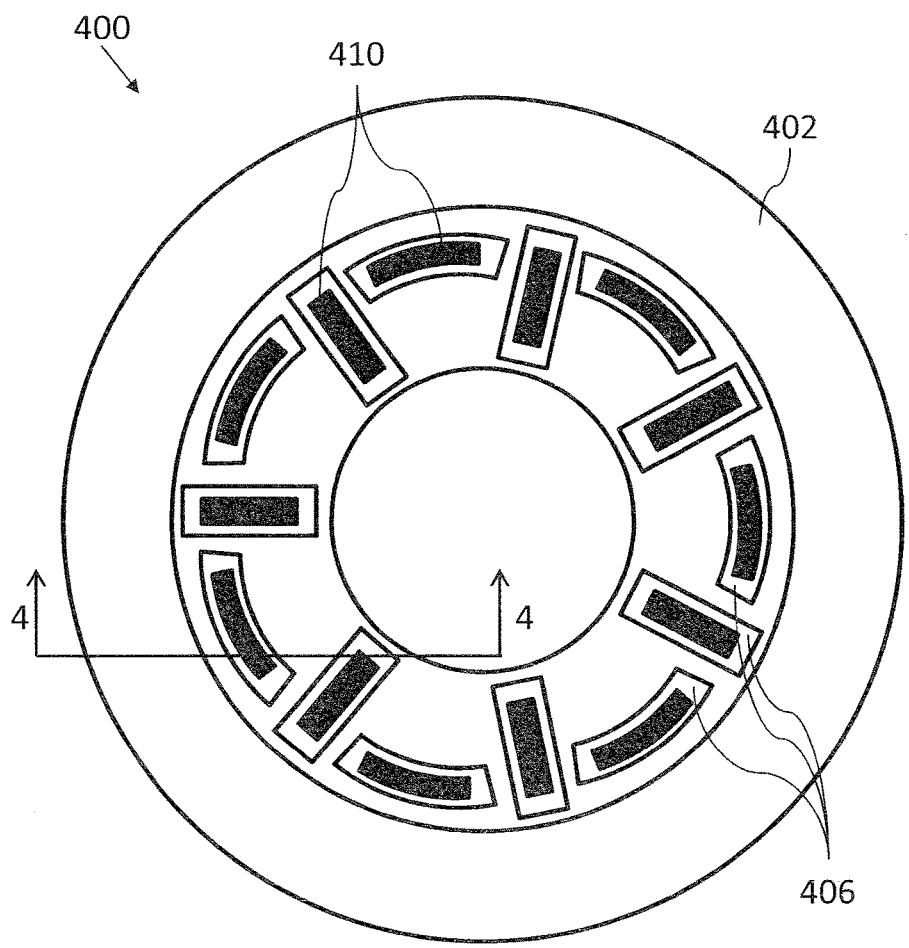
FIG. 4A illustrates an elevation view of an example arrangement of an apparatus 400 for heating molds.

FIG. 4A illustrates an elevation view of an example arrangement of an apparatus 400 for heating molds. Apparatus 400 may include a mold 402. Mold 402 may be a sideplate for a tire mold.

Mold 402 may include at least one pocket 406. At least one pocket 406 may contain at least one THE 410. At least one THE 410 may be configured to heat at least a portion of a MSCT (not shown) of mold 402. At least one IHE 410 may be configured to heat at least a portion of mold 402.

As illustrated, at least one pocket 406 and/or THE 410 may extend substantially circumferentially about mold 402 and at least one pocket 406 and/or THE 410 may extend substantially radially in mold 402. Alternatively, at least one pocket 406 and/or IHE 410 may extend in any of a variety of directions, including for example circumferentially, radially, or a combination of the circumferential and radial directions. Alternatively, at least one pocket 406 and/or THE 410 may extend in any combination of directions.

Figure 4B:
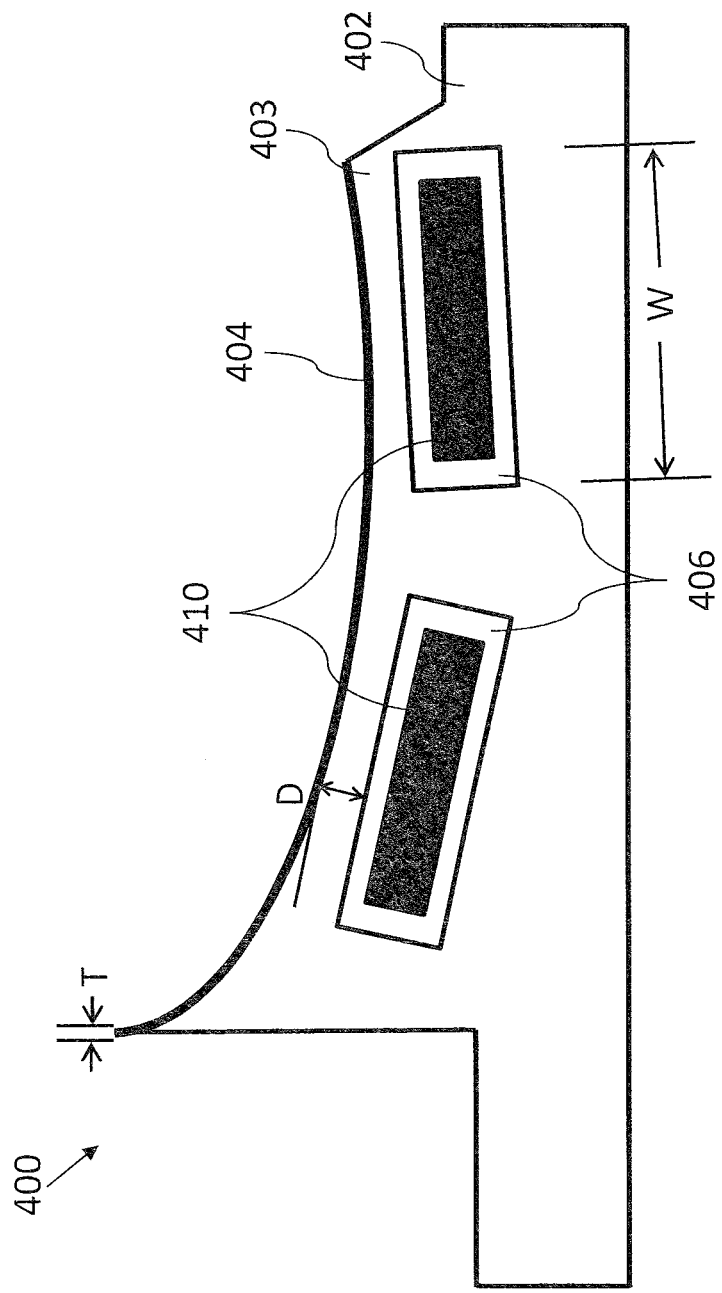
FIG. 4B illustrates a sectional view of apparatus 400 taken on line 4-4 in FIG. 4A.

FIG. 4B illustrates a sectional view of apparatus 400 taken on line 4-4 in FIG. 4A. Mold 402 may include a base material 403. Mold 402 may include a MSCT 404. At least one pocket 406 may be separated from MSCT 404 by a depth D of mold 402. Depth D may be selected in the same manner as depth D described above with respect to FIG. 1A. At least one pocket 406 may have a width W, selected in the same manner as width W described above with respect to FIG. 1A.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A system for heating a tire mold, comprising:
a tire mold formed from a mold material having a base material relative magnetic permeability,
wherein the tire mold includes a mold surface for contacting a tire, the mold surface for contacting a tire having a mold surface for contacting a tire relative magnetic permeability,
wherein the tire mold includes a mold back oriented substantially opposite the mold surface for contacting a tire,
wherein the mold surface for contacting a tire relative magnetic permeability is greater than the base material relative magnetic permeability,
wherein the tire mold includes a plurality of pockets oriented in at least one row about at least a portion of a circumference of the tire mold,
wherein the tire mold includes a plurality of induction heating elements,
wherein each of the plurality of pockets includes at least one of the plurality of induction heating elements, and
a cooling device coupled to the at least one induction heating element.

2. The system of claim 1, wherein the tire mold is a segmented tread mold including individual tread mold segments.

3. The system of claim 1, wherein the tire mold includes at least one of a sideplate mold, a sidewall mold, a bead ring mold, and a tread ring mold.

4. The system of claim 1, wherein at least one of the plurality of induction heating element is connected to the mold back.

5. The system of claim 1, wherein a channel extends from each of the plurality of pockets to the mold back.

6. The system of claim 1, wherein each of the plurality of pockets of the at least one row has one of a circumferentially-extending orientation, a radially-extending orientation, an axially-extending orientation, and an orientation between any two of these orientations.

7. The system of claim 1, wherein the at least one row of the plurality of pockets includes one of a concentric pattern and a radial pattern.

8. A system for heating a tire mold, comprising:
a tire sideplate mold,
wherein the tire sideplate mold includes a mold surface for contacting a tire,
wherein the tire sideplate mold includes a mold back oriented substantially opposite the mold surface for contacting a tire,
wherein the tire sideplate mold includes a plurality of pockets oriented in at least one row about at least a portion of a circumference of the tire sideplate mold,
wherein the tire sideplate mold includes a plurality of induction heating elements,
wherein each of the plurality of pockets includes at least one of the plurality of induction heating elements, and
a cooling device coupled to the at least one induction heating element.

9. The system of claim 8, wherein a channel extends from each of the plurality of pockets to the mold back.

10. The system of claim 8, wherein each of the plurality of pockets of the at least one row has one of a circumferentially-extending orientation, a radially-extending orientation, an axially-extending orientation, and an orientation between any two of these orientations.

11. The system of claim 8, wherein at least a portion of the mold surface for contacting a tire is coated with a metallic surface coating.

12. The system of claim 8, wherein the tire sideplate mold is formed from a base material having a base material relative magnetic permeability, wherein at least a portion of the mold surface for contacting a tire has a mold surface for contacting a tire relative magnetic permeability, and wherein the mold surface for contacting a tire relative magnetic permeability is greater than the base material relative magnetic permeability.

13. The system of claim 10, wherein the plurality of pockets of the at least one row includes an alternating pattern, such that the plurality of pockets alternates between the circumferentially-extending orientation and the radially-extending orientation about the at least a portion of the circumference of the tire sideplate mold.

14. The system of claim 8, wherein the at least one row of the plurality of pockets includes one of a concentric pattern and a radial pattern.

15. A system for heating a tire mold, comprising:
a tire bead ring mold,
wherein the tire bead ring mold includes a mold surface for contacting a tire,
wherein the tire bead ring mold includes a mold back oriented substantially opposite the mold surface for contacting a tire,
wherein the tire bead ring mold includes a plurality of pockets oriented in at least one row about at least a portion of a circumference of the tire bead ring mold, wherein the tire bead ring mold includes a plurality of induction heating elements, wherein each of the plurality of pockets includes at least one of the plurality of induction heating elements, and a cooling device coupled to the at least one induction heating element.

16. The system of claim 15, wherein at least one channel extends from each of the plurality of pockets to the mold back.

17. The system of claim 15, wherein at least a portion of the mold surface for contacting a tire is coated with a metallic surface coating.

18. The system of claim 15, wherein the tire bead ring mold is formed from a base material having a base material relative magnetic permeability, wherein at least a portion of the mold surface for contacting a tire has a mold surface for contacting a tire relative magnetic permeability, and wherein the mold surface for contacting a tire relative magnetic permeability is greater than the base material relative magnetic permeability.

19. The system of claim 15, wherein each of the plurality of pockets of the at least one row has one of a circumferentially-extending orientation, a radially-extending orientation, an axially-extending orientation, and an orientation between any two of these orientations.

20. The system of claim 15, wherein the at least one row of the plurality of pockets includes one of a concentric pattern and a radial pattern.

\* \* \* \* \*

UNITED STATES PATENT AND TRADEMARK OFFICE
CERTIFICATE OF CORRECTION

PATENT NO.        : 10,220,584 B2
APPLICATION NO.   : 15/540128
DATED             : March 5, 2019
INVENTOR(S)       : Seroka It is certified that error appears in the above-identified patent and that said Letters Patent is hereby corrected as shown below:

In the Claims

In Column 14, Line 2, Claim 4, delete "element" and insert -- elements --.

Signed and Sealed this
Twenty-second Day of October, 2019

Andrei Iancu
*Director of the United States Patent and Trademark Office*